(12) United States Patent
Becker

(10) Patent No.: X7614
(45) Date of Patent: Jun. 29, 1833

(54) DISTILLERY

(76) Inventor: Henry Becker

Henry Becker of Warwick Township Pa.
Letters Patent. Dated June 29. 1833.

The schedule referred to in these Letters Patent and making part of the same. containing a description in the words of the said Henry Becker himself, of his Improvement in the con-struction of a Distillery. —

To all to whom these presents shall come:

Be it Known that I. Henry Becker of Warwick Township Lancaster County & State of Pennsylvania, distiller, have invented a new & useful improvement in the construction of a distillery for the purpose of distilling & that the following is a full & exact description of the construction & operation of the same as in-vented or improved by me. —

A neck is made to fit on to the common still of about four feet six inches long in two pieces, the lower piece about half the length of the upper one & so much wider as to slip up over the upper one which is necessary to form an opening at the mouth of the still for the purpose of cleaning it or otherwise. — A beer tub or boiler is placed on a frame at the distance of three feet above the Still, & the upper joint of the neck of the still is inserted into the bottom of said tub, to the height of eighteen inches above the same. — A doubling head is made of about fourteen inches in diameter, & about the same length, with a pipe going out from the top of it, of about four inches in width at the large end & tapering upwards, so as to fit the size of the worm. —

This head is placed within the neck of the still, at the top, the pipe of which extends thro' the top of the tub: there are several tubes connected with the upper end of the neck of the still, & project upwards to a sufficient height to project above or out of the beer & are bent so as to sink the other end down into the beer, thro' these tubes the steam ascends & is conducted down into the beer. — One other tube is let down into the doubling head, & extends nearly to the bottom thereof, & upwards nearly to the head of the beer tub, & is widened at the top like a funnel for the purpose of receiving the steam in the beer tub or boiler & conducting it into the doubling head. —

Another crooked tube is inserted thro' the beer tub or boiler & let into the top of the doubling head & extends nearly to the bottom thereof, the use of which is to convey the singlings into the doubling head. — The advantages this mode possesses over the common mode of distilling is First, that the beer surrounding the top of the neck is immediatily heated thereby, which heat is further increased by the steam passing thro' the tubes into the beer. —— Secondly. The doubling head is heated by its being shut up in the neck of the still it also receives an additional heat thro' the funnel tube from the heated air in the top of the boiler. —— Thirdly. The beer in the boiler is half driven off before it is let down into the still, & by the time this is driven off in the still, the same effect has again been produced in the boiler.

Fourthly. By this mode doubling is produced twice, first in the beer, & then in the doubling head, thereby producing the liquor clearer & more of it. — Lastly. This mode taken together will be done by two thirds of the fuel requisite in the common mode of distilling. —

In testimony that the above is a true specification of my said improvement as above described I have hereunto set my hand the fourth day of June A.D. 1833.

Witneſses.
Samuel Dale
Samuel F. Dale

Henry Becker.

800 words.